(12) United States Patent
Stridsberg

(10) Patent No.: US 9,735,654 B2
(45) Date of Patent: Aug. 15, 2017

(54) COOLED MAGNET MOTOR

(75) Inventor: Lennart Stridsberg, Stockholm (SE)

(73) Assignee: STRIDSBERG INNOVATION AB, Stockholm (SE)

( * ) Notice: Subject to any disclaimer, the term of this patent is extended or adjusted under 35 U.S.C. 154(b) by 798 days.

(21) Appl. No.: 14/003,812

(22) PCT Filed: Mar. 9, 2012

(86) PCT No.: PCT/SE2012/000032
§ 371 (c)(1),
(2), (4) Date: Sep. 9, 2013

(87) PCT Pub. No.: WO2012/121643
PCT Pub. Date: Sep. 13, 2012

(65) Prior Publication Data
US 2013/0342049 A1    Dec. 26, 2013

(30) Foreign Application Priority Data

Mar. 9, 2011   (SE) ...................... 1100161
Sep. 19, 2011  (SE) ...................... 1100684
(Continued)

(51) Int. Cl.
  *H02K 1/32*      (2006.01)
  *H02K 9/19*      (2006.01)
  *H02K 5/20*      (2006.01)
(52) U.S. Cl.
  CPC ............... *H02K 9/19* (2013.01); *H02K 1/32* (2013.01); *H02K 5/20* (2013.01)

(58) Field of Classification Search
  CPC ............... H02K 1/32; H02K 5/20; H02K 9/19
  See application file for complete search history.

(56) References Cited

U.S. PATENT DOCUMENTS 6,144,130 A       11/2000  Kawamura et al.
2005/0258693 A1   11/2005  Stevens et al.
(Continued)

FOREIGN PATENT DOCUMENTS

CN    101627523 A    1/2010
DE    10122425 A1    11/2002
(Continued)

OTHER PUBLICATIONS

Chinese Office Action and English translation thereof for corresponding application 201280022455 dated Jul. 30, 2015.
(Continued)

*Primary Examiner* — Dang Le
(74) *Attorney, Agent, or Firm* — Renner, Otto, Boisselle & Sklar, LLP

(57) ABSTRACT

An electric motor/generator includes a rotor with magnets mounted on the surface of the rotor, the magnets facing the stator over a gap. The magnets have a very high flux density but a limited ability to withstand high stator currents at high temperatures, preferably magnets made of the N48H material. By providing rotor magnet cooling means that reduces the temperature of the magnets by a cooling fluid, use of magnets with lower maximum working temperature and higher flux density is permitted and thereby higher flux can be obtained from the magnets.

8 Claims, 8 Drawing Sheets

(30) Foreign Application Priority Data

| Oct. 12, 2011 | (SE) | 1100682 |
| Oct. 12, 2011 | (SE) | 1100754 |
| Oct. 17, 2011 | (SE) | 1100773 |
| Nov. 9, 2011 | (SE) | 1100835 |
| Dec. 16, 2011 | (SE) | 1100928 |
| Jan. 18, 2012 | (SE) | 1200045 |

(56) References Cited

U.S. PATENT DOCUMENTS

| 2007/0228847 A1* | 10/2007 | Kim | H02K 1/32 |
| | | | 310/61 |
| 2009/0261667 A1* | 10/2009 | Matsubara | H02K 1/2766 |
| | | | 310/54 |
| 2011/0254398 A1* | 10/2011 | Hansen | H02K 7/025 |
| | | | 310/113 |

FOREIGN PATENT DOCUMENTS

| DE | 102005057177 A1 | 6/2007 |
| DE | 102007006986 B3 | 6/2008 |
| EP | 2058941 A1 | 5/2009 |
| EP | 2239435 A | 10/2010 |
| JP | 2002-051503 A † | 2/2002 |
| JP | 2003-309948 A † | 10/2003 |
| WO | 2012044177 A1 † | 4/2012 |

OTHER PUBLICATIONS

Aglen, O. et al., "Thermal Analysis of a High-Speed Generator," Conference Record of the 2003 IEEE Industry Applications Conference, 38th IAS Annual Meeting, Salt Lake City, Utah, Oct. 12-16, 2003; New York, NY: IEEE, US; doi:10.1109/IAS.2003.1257554; ISBN 978-0-7803-7883-4; ISBN 0-7803-7883-0; vol. 1, pp. 547-554.

International Search Report from corresponding International Application No. PCT/SE2012/000032, dated Jul. 19, 2012.

Alexander Stening, Design and Optimization of a Surface-Mounted Permanent Magnet Synchronous Motor for a High Cycle Industrial Cutter; Mar. 2006, Stockholm; Royal Institute of Technology.†

\* cited by examiner
† cited by third party

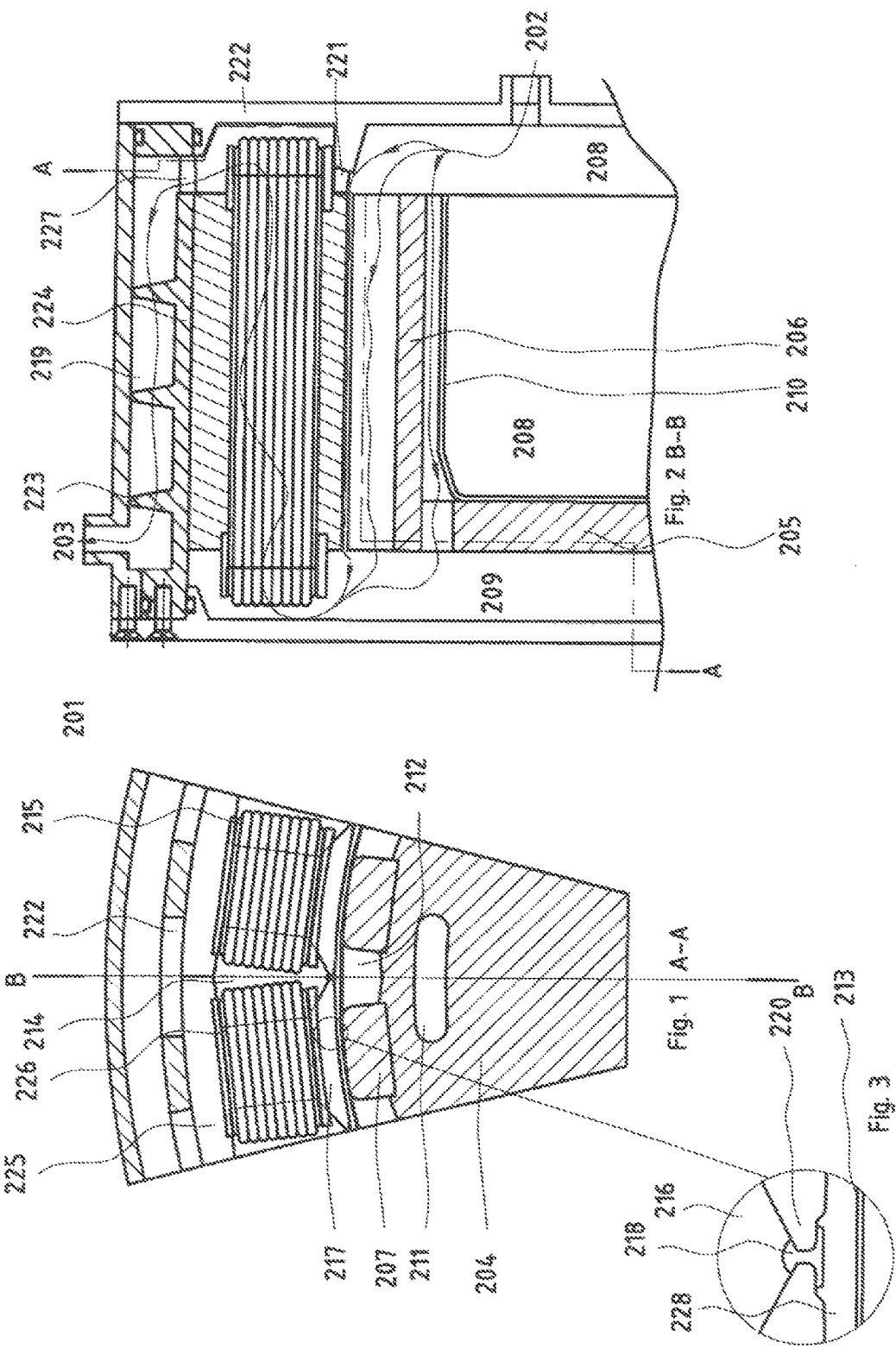

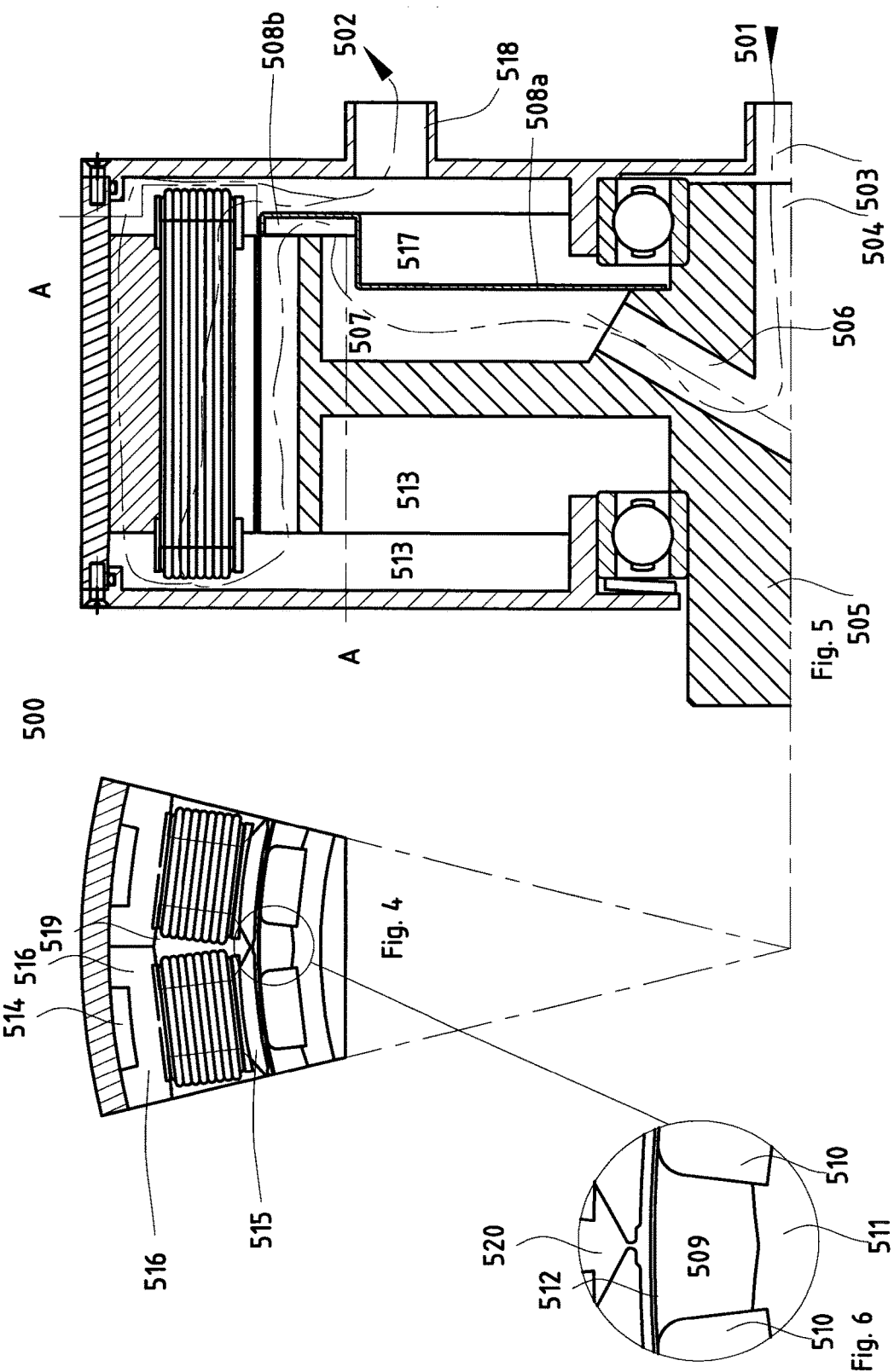

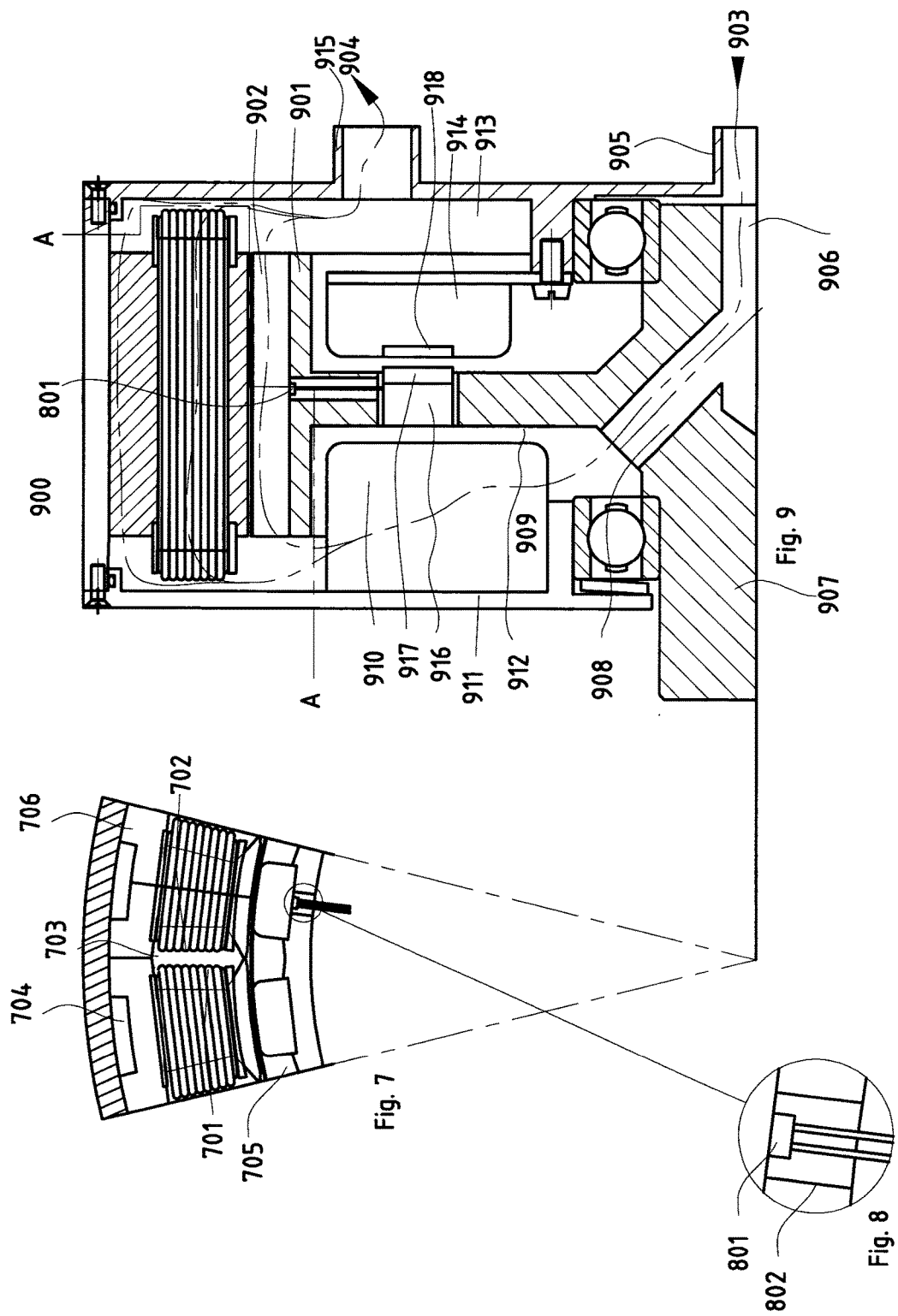

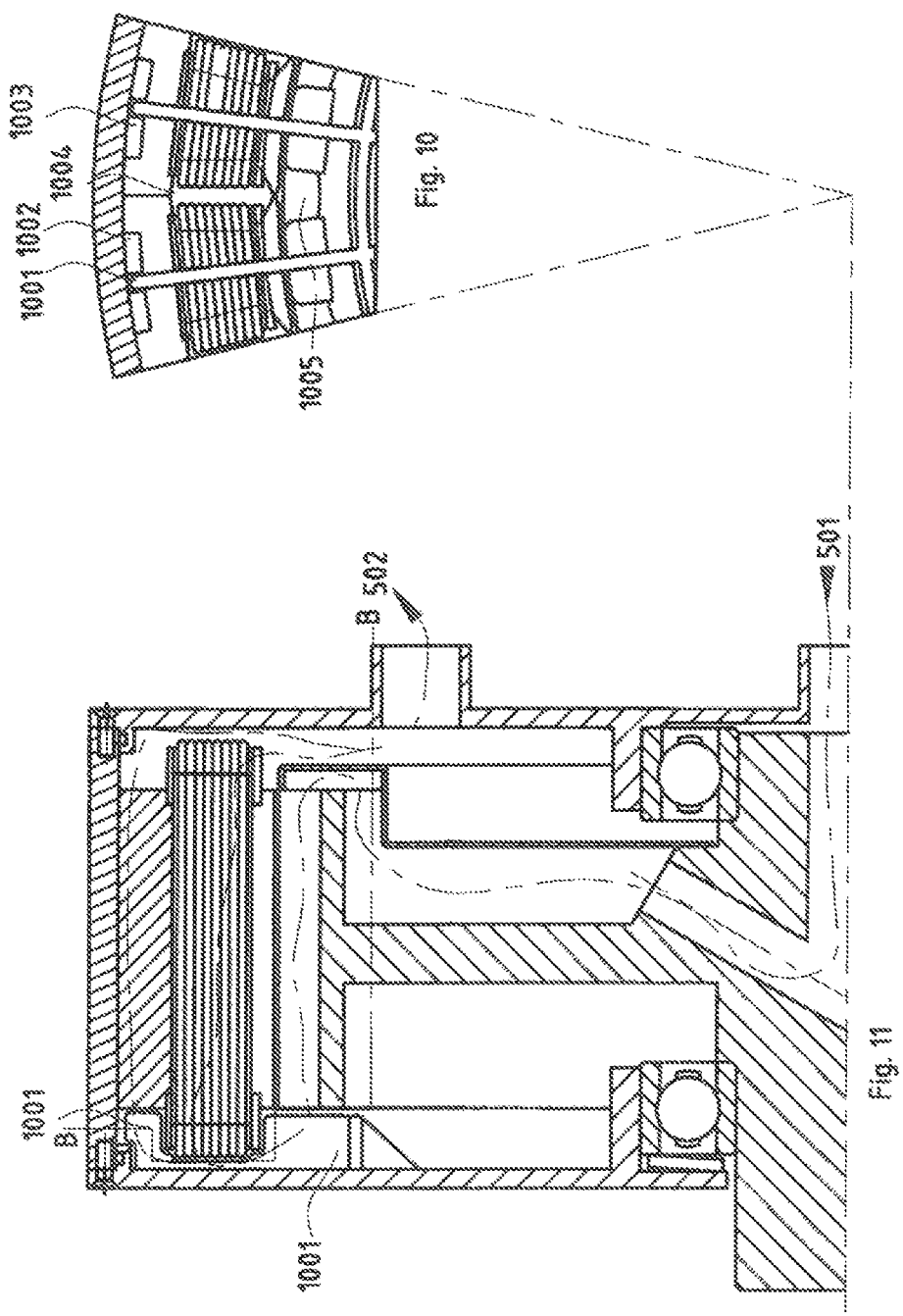

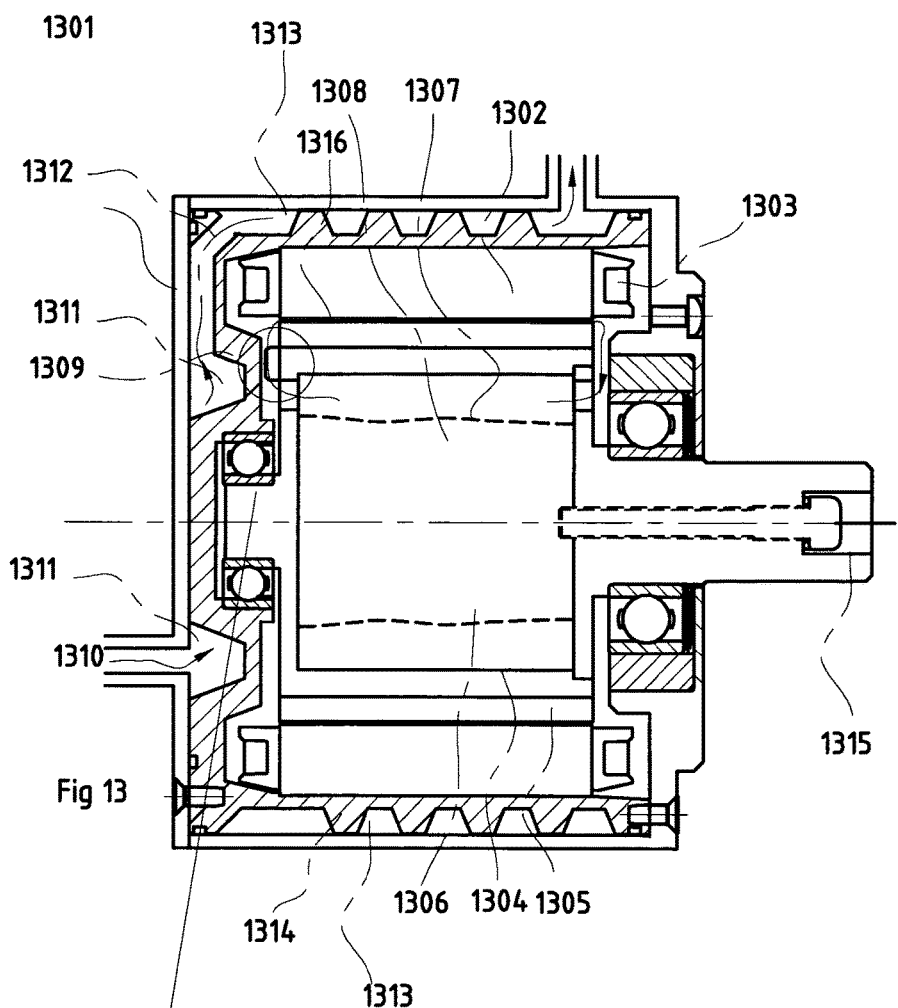
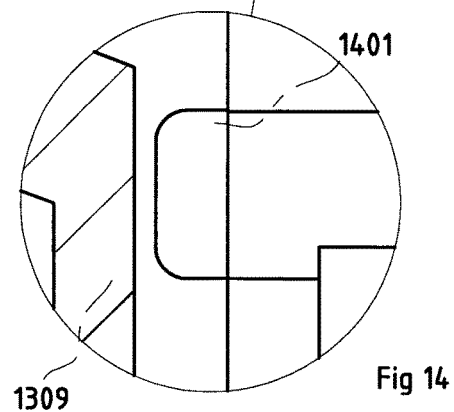
Fig 13
Fig 14 ically cooled magnets, thus securing cooling of the magnets.

COOLED MAGNET MOTOR

TECHNICAL FIELD

The invention is concerned with cooled electric motors and generators.

BACKGROUND ART

Electric generators and motors with permanent magnet rotors are often cooled by liquids in thermal contact with the stator. Most of the heat is generated in the iron stator poles, the stator winding and to a lesser extent the rotor magnets. The magnets are in most cases in the centre of the motor inside the stator. The heat is generated mostly in the stator between the magnets and the cooling mantle and the cooling takes place outside the stator. The temperature of the magnets is therefore high.

The temperature of the magnets and windings affects the losses of the motor/generator in two ways. The temperature of the copper in the winding affects the resistance of the copper material as the resistance increases with temperature. Therefore, more heat is generated in a hot winding for a given current. If (which is normally the case) the heat from the winding increases the temperature of the magnets, the magnet flux will decrease, thus creating less torque for a given current. These two effects reinforce each other. A hot magnet will give a lower magnetic field. To maintain the same torque, more current has to be used. This will cause the winding to become hotter, which will increase the winding resistance, causing the windings to become even hotter, etc.

SUMMARY OF INVENTION

A purpose of the invention is to provide means for the rotor magnets to be cooled to permit the use of magnets with lower maximum working temperature and higher flux density and thereby obtain higher flux from the magnets.

Another purpose of the invention is to provide means for the rotor magnets to be cooled to obtain higher flux from the magnets.

Another purpose of the invention is to provide means for the rotor magnets to be cooled to reduce the risk of demagnetisation of the magnets.

Another purpose of the invention is to provide a very efficient cooling of the stator coils and stator soft iron components, thus reducing the heating of the magnets from these components.

To permit the use of an internal cooling fluid in the motor gap, the expansion of the fluid must be handled. It is a purpose of the invention to provide means to handle this without increasing the size of the motor.

Field weakening is a method to permit motors to run at speeds that are so high that the emf from the motor windings gets close to or above the rail voltage in the inverter system feeding current to the motor. This mode of operation is known to create an increased risk of magnet demagnetisation due to a combination of high magnetic stress and high magnet temperature. It is purpose of the invention to supply the motor current inverter with data on the magnet temperature so that the controller can limit the motor currents to values that are not overstressing the magnets.

According to the invention there is provided an electric motor/generator, comprising a rotor with magnets mounted on the surface of the rotor, the magnets facing the stator over a gap, the magnets having a very high flux density but a limited ability to withstand high stator currents at high temperatures, preferably magnets made of the N48H material, and rotor magnet cooling means that reduces the temperature of the magnets by a cooling fluid. By providing rotor magnet cooling means that reduces the temperature of the magnets by a cooling fluid, use of magnets with lower maximum working temperature and higher flux density is permitted and thereby higher flux can be obtained from the magnets.

In a preferred embodiment, the rotor magnet cooling means comprises means that forces a cooling fluid from a source external to the motor/generator to pass channels consisting of two adjacent magnets, the magnets carrying soft iron rotor and the magnets holding bandage thus cooling the magnets directly on two sides of the magnets and indirectly via the soft iron rotor on a third side of the magnets.

In a preferred embodiment, the electric motor/generator is adapted to allow all cooling fluid to enter into the motor/generator and to further lead all cooling fluid to the rotor magnet channels through a path, wherein the heating of the fluid is kept low, preferably below 4° C.

In a preferred embodiment, the electric motor/generator is adapted to allow the cooling fluid to enter into the motor/generator and to further lead part of the cooling fluid to the rotor magnet channels through a path, wherein the heating of the temperature is kept low, preferably below 4° C.

In a preferred embodiment, the electric motor/generator comprises at least one temperature transducer arranged in close contact with a magnet, wherein the temperature transducer is adapted to sense the temperature of the at least one magnet.

In a preferred embodiment, the temperature transducer is connected to a signal transfer unit adapted to transfer temperature signals corresponding to temperature sensed by the temperature transducer where the temperature signal is transferred from a rotating part such as the rotor disc to a static part over for example a radio link inside the motor case, a Bluetooth device, a set of LEDs on the rotor and a set of photo receivers on the motor chassis using frequency modulation or an inductive coupling device.

In a preferred embodiment, the cooling of the magnets is accomplished by means of a cooling fluid from a source internal to the motor/generator that fills the gap between rotor magnets and the stator thus reducing the thermal resistance in the path from the magnets to an external cooling fluid through the stator poles and the stator tube.

In a preferred embodiment, the cooling of the magnets is further improved by a transport by means of a pumping device of internal cooling fluid from a surface directly cooled by the external cooling fluid to the gap between rotor magnets and the stator.

In a preferred embodiment, the electric motor/generator comprises a rotor cavity inside the rotor, both cooling fluid and air inside the motor cavities, and holes in the rotor permitting a cooling fluid internal to the motor to enter and leave the rotor depending on the change in cooling fluid volume caused by motor temperature differences.

In a preferred embodiment, the electric motor/generator comprises a ventilation tube with free access to the ambient air in one end and having its other end inside the rotor cavity.

In a preferred embodiment, the position of the ventilation tube mouthpiece inside the rotor cavity and the volume of the cooling fluid is selected in such a way that the surface of the cooling fluid does not reach the mouthpiece of the ventilation tube regardless of how the motor is tilted.

In a preferred embodiment, the volume of the cooling fluid is selected so that there always is fluid in the rotor-stator gap (when the rotor rotates and that the pressure inside the motor at any temperature is low enough to avoid leakage through the shaft seals.

In a preferred embodiment, electric motor/generator comprises a control system having a control unit adapted to obtain data on the stator coil temperature through at least one sensor, preferably a thermistor, inserted in some stator coils and data on the magnet temperature from at least one sensor placed on or thermally close to one of the rotor magnets, the control unit being able to adjust the cooling fluid temperature or flow through control over the coolant fluid pump and/or radiator in order to affect the temperature of the stator coils and magnets.

In a preferred embodiment, the electric motor/generator comprises a control system having a control unit controlling the current to the stator coils by switches and adapted to obtain data on the magnet temperature from at least one sensor placed on or thermally close to one of the rotor magnets, the control unit limiting the current to the stator coils to values that will not cause irrevocable demagnetization of the magnet at the actual magnet temperature.

BRIEF DESCRIPTION OF DRAWINGS

The invention is now described, by way of example, with reference to the accompanying drawings, in which:

FIGS. 1 to 11 show systems with cooling of rotor and stator components by an external coolant fluid that is heated in the motor/generator and is cooled outside of the motor, of which figures:

FIG. 1 shows sections of the motor or generator shown in FIG. 2.

FIG. 2 shows a motor or generator with a permanent magnet rotor with arrangements to cool the rotor magnets to a low temperature and the stator to a less low temperature with a cooling fluid.

FIG. 3 shows a stator teeth-to-teeth seal.

FIG. 4 shows sections of the motor or generator shown in FIG. 5.

FIG. 5 shows a motor or generator with a permanent magnet rotor with arrangements to cool the rotor magnets to a low temperature and the stator to a less low temperature with a cooling fluid.

FIG. 6 shows an enlargement of a channel for cooling fluid on the rotor.

FIG. 7 shows a coil shape suitable for even cooling of the coils.

FIG. 8 shows a magnet temperature measurement device.

FIG. 9 shows a magnet temperature measurement device and arrangements to reduce the rotation of volumes of fluids FIG. 10 shows sections of the motor or generator shown in FIG. 11.

FIG. 11 shows a coil shape suitable for even cooling of the coils and devices to ensure even distribution of the cooling fluid.

FIGS. 12 to 15 show systems with cooling of rotor and stator components by an internal coolant fluid that is heated by the magnets in the motor/generator and is cooled inside of the motor, of which figures:

FIG. 12 shows a motor or generator with a permanent magnet rotor with arrangements to cool the rotor through the stator teeth over a heat transportation fluid such as oil and means to eliminate the pressure difference between the motor and ambient.

FIG. 13 shows a motor or generator with a permanent magnet rotor with arrangements to cool the rotor through the stator teeth over a heat transportation fluid such as oil and means to reduce the pressure difference between the motor and ambient.

FIG. 14 shows a partial enlargement of the motor of FIG. 13.

FIG. 15 shows a motor similar to that of FIG. 13 but with a partially potted stator and without internal pump.

DESCRIPTION OF EMBODIMENTS

Figure 12:
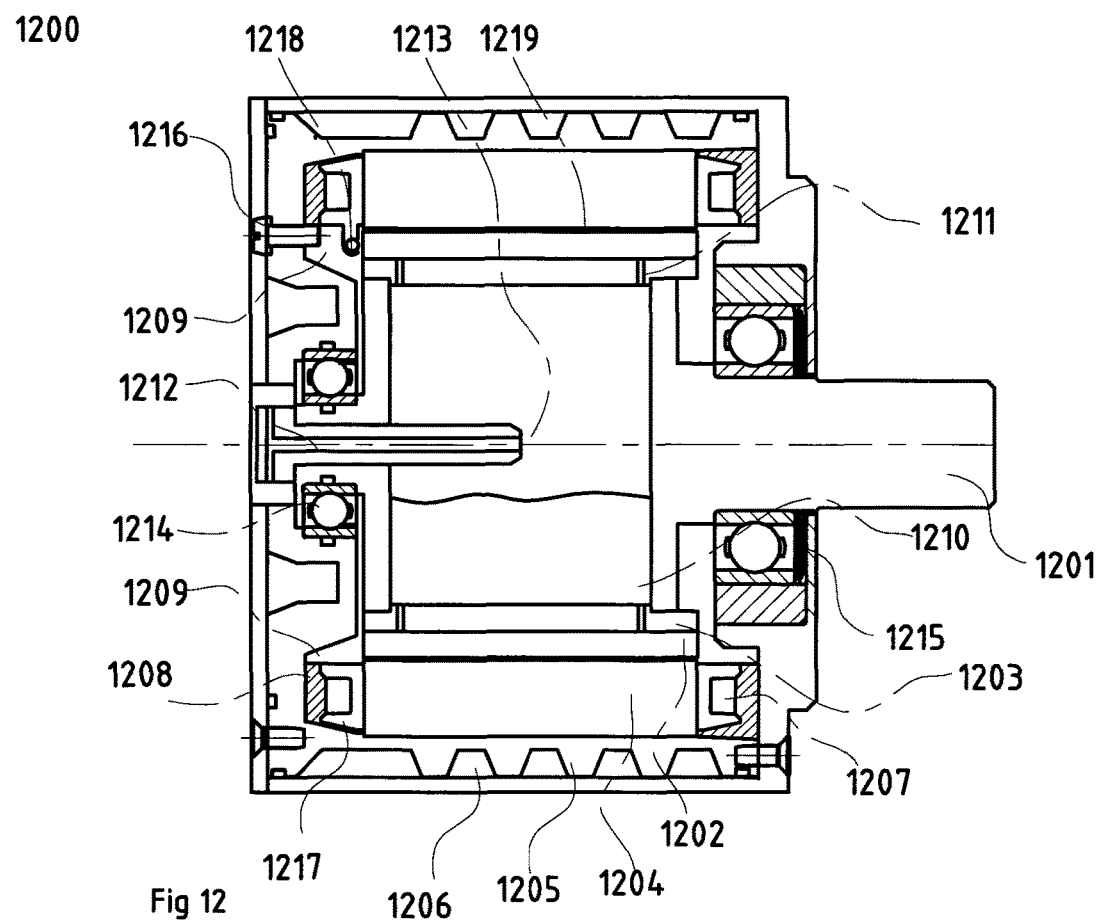

In the following, a detailed description of the invention will be given. It will be appreciated that these figures are for illustration only and are not in any way restricting the scope of the invention.

FIG. 1 shows a section A-A perpendicular to the axis of the motor or generator shown in FIG. 2.

FIG. 2 shows a section B-B parallel with the axis of the same permanent magnet motor/generator 201. The magnets have a very high BH product and a limited ability to withstand high stator currents at high temperatures. The cooling of the magnets is performed by a stream of cooling fluid that after entering into the motor/generator is led to the rotor magnet channels through a path (202-208) that does not cause any substantial heating of the fluid.

The fluid follows the path indicated by the thin line from 202 to 203. The rotor 204 has disc shaped part 205 and a hollow cylindrical part 206 on which the magnets 207 are assembled.

The cooling fluid can pass from the right cavity 208 to the left cavity 209 through one of three openings. (In some embodiments, one or two of these may be omitted or give very low flow). The lowest opening is to enter between the channel forming part 210 and the magnet carrier 206 and further through the openings 211. The second path is through the channels 212 defined between two adjacent magnets 207, the magnet carrier 206 and the item 213 (shown in the enlargement FIG. 3). Item 213 is commonly used in the industry to keep magnets in place and can consist of carbon fibre, glass fibre, heat shrink film, a stainless steel tube, etc. The third opening is in the gap 228 between rotor and stator. The area of opening 211 depends on the area of the opening 212 between the magnets. Low and wide magnets will result in small area for opening 212 and may require a larger opening 211.

After entering cavity 209, the fluid will be forced to pass the cavity 214 between the two coils 215 or the cavity 216 between the stator teeth 217. To avoid that the fluid will leak from the cavity 208 to the upper cavity 219, there are elastic seals 218 fitting a recess in the stator pole tip 220 and another seal 221 between the stator pole 217 and the right motor shield 222.

Basically, the whole rotor 205-206 is immersed in the cooling fluid. This also provides some cooling of the whole rotor and thereby also for the magnets.

The fluid will finally enter the upper cavity 219 through openings 227. This cavity consist partially of a screw thread device made up by a spiral forming threads like item 223 on a tube 224. The outer part 225 of the soft iron stator poles are in direct contact with the tube 224 and heat from the stator poles can therefore flow through the tube 224 and further to the cooling fluid.

FIG. 3 is an enlargement of a part of FIG. 1. The gap 228 between the stator poles 220 and the rotor bandage 213 is clearly visible in this enlargement. This gap is normally named "air gap". As the gap is filled by the cooling fluid in the embodiments described in this application, the word "gap" is used in this text.

As an example, the cooling fluid may enter the motor with an inlet temperature of 55° C. The fluid passing below the magnets will take up heat from the magnet carrier 206. This heat is generated by eddy currents in the magnet carrier and in the magnets 207. Some heat is also conducted from the stator poles 217 to the cooling fluid in the "gap" 228. The fluid passing through the cavity 212 will absorb heat from the magnets 207 and from the magnet carrier 206. It is advantageous if the bandage 213 has poor thermal conductivity, for example being made of impregnated glass fiber. Finally, the remaining fluid will pass through the gap 228. It will absorb heat from the stator poles 217. It is important that the fluid in the "gap" is replaced by fresh, cool fluid; this can be controlled by adjusting the areas of the cavities 211 and 212.

The fluid will then pass the cavities 214 or 216. Cavity 214 faces the outer winding layer of the stator coils 215. The outmost layer 226 will therefore be in direct contact with the fluid. The heat generated in the innermost layers of the stator winding 215 will either pass outward to the outmost layer 226 or through the stator pole towards the tube 224. By providing an efficient cooling of the stator coils, the temperature of the stator poles 217 facing the rotor magnets 207 will be lower, thus reducing the temperature of the magnets.

FIG. 4 shows a section of the motor or generator shown in FIG. 5.

FIG. 5 shows a motor or generator 500 with a permanent magnet rotor with arrangements to cool the rotor and the stator with a cooling fluid entering at 501 and exiting at 502. It is arranged in such a way that cooling fluid will first reach the magnets which therefore can be kept at a temperature close to that of the incoming fluid.

The fluid enters trough a mouthpiece 503 and further to a channel 504 in the shaft 505. From channel 504 there is at least one further channel 506 that ends in a fluid reservoir 507. The reservoir wall 508a outer end 508b leads the fluid up to the cavities 509 between the magnets 510, the magnet support cylinder 511 and the bandage 512, these items shown in the enlargement FIG. 6. The cooling fluid will thereby reach the left and right side of the magnets 510 directly, but will also cool the magnet support cylinder (that is made of a soft magnetic material like iron) and thereby also cool the lower side of the magnets through the support cylinder 511. The upper side is covered by the bandage 512 that preferably has a low thermal conductivity.

After passing the channel 509, the fluid enters another reservoir 513. From there, the only exits are the cavities 519 and 520 and the stator pole cooling channels 514.

The lower part of a stator pole is shown as 515. The middle part is hidden inside the winding 215 and the upper part is shown as 516. Cut-outs 514 in the upper stator pole permit cooling fluid to be in direct contact with the stator material.

After passing the one of the three channels 214, 216 and/or 514, the fluid enters the reservoir 517 that exits through the exit 518.

FIG. 7 shows a different shape of the coils 701 and 702. This shape creates a channel 703 with two parallel sides, thereby creating an even speed of the cooling fluid over the coils. There are two other channels for the fluid. Channel 704 cools the stator laminations 706 and channel 705 cools the magnets.

FIG. 8 shows a temperature measuring device 801 assembled on the magnet surface through a hole 802 in the rotor. The device can for example be a thermistor or a Pt100 resistor.

FIG. 9 shows a motor or generator 900 with a rotor 901 with permanent magnets 902 and arrangements to cool the rotor and to measure the temperature of the magnets. The magnets and stator are cooled by a cooling fluid entering at 903 and exiting at 904.

The fluid enters trough a mouthpiece 905 and further to a channel 906 in the shaft 907. From channel 906 there is at least one further channel 908 that ends in a fluid reservoir 909. The reservoir has fins 910 in radial direction that are fixed in relation to the front shield 911. Their purpose is to counteract the forces that otherwise would set the fluid in reservoir 909 to rotate.

The cooling fluid stream will split into three parts through the channels shown as 703, 704 and 705 in FIG. 7. With the arrangement shown in FIG. 5, the whole flow will first reach the magnets which therefore can be kept at a temperature close to that of the incoming fluid. To get the same low temperature with the arrangement shown in FIG. 9, a higher total fluid flow will be required as only a fraction of the flow will pass through channel 705 between the magnets.

After passing the channels 703-705, the fluid enters another reservoir 913. Also this volume has radial fins 914 to reduce rotation of the fluid in cavity 913. Finally the fluid exits through a mouthpiece 915.

A temperature measuring device 801 is shown also in FIG. 9 and is there connected to a signal transfer unit 916 mounted on the rotor disc 912. The unit contains an energy storage that is charged through a pick-up coil 917 that is fed by a set of magnets 918 on the static fins like 914 when the motor/generator rotates.

The signal transfer unit 916 that transfers data from the rotor to the motor chassis can be based on for example a radio link inside the motor case, a Bluetooth device, a set of LEDs on the rotor and a set of photo receivers on the motor chassis using frequency modulation or an inductive coupling device. The chassis mounted receiver is not shown. The transfer unit may handle several temperature sensors mounted on different magnets.

FIGS. 10 and 11 show a motor similar to the one shown in FIGS. 4-6. It has a coil shape suitable for even cooling of the coils and devices 1001 to ensure even distribution of the cooling fluid. The device 1001 creates sections with low resistance to the flow in a preferred direction. Such a section contains on the average one fluid inlet 1005 (depending on the position of the rotor) between two magnets and three outlets 1002, 1003 and 1004. The device 1001 creates narrow passages for a fluid to flow from one section to the adjacent.

FIG. 12 shows a section through a motor or generator 1200 with a permanent magnet rotor 1201 with arrangements to cool the rotor through an internal heat transportation fluid such as oil that transfers the heat generated in the rotor magnets 1202 and rotor back iron 1203 to the stator teeth 1204 and thereafter to the stator tube 1205. In the embodiment shown, the stator tube is cooled by an external cooling liquid running in channels 1206. Alternatively, the stator tube can be air cooled. The stator windings 1207 are kept in place by a bobbin 1217 and further insulated by a potting material such as epoxy or silicone 1208. The cavities 1209 and the stator to rotor gap are filled by the internal heat transporting fluid that can be filled by removing the sealed screw 1216. The excess fluid for a non rotating motor is shown as the volume 1210. When the rotor rotates, the excess fluid will be forced by the centrifugal force to fill the gap and other volumes outside the gap, and the remaining fluid will make an even layer inside the rotor.

The magnet temperature is not sensed by a sensor in close contact with a magnet. Instead, a sensor 1218 such as a thermistor is located close to the magnets and immersed in the cooling fluid when the motor rotates.

When the fluid expands due to heating, fluid will move through holes 1211 into the rotor cavity. The pressure will remain at ambient as the air in the rotor cavity will have free access to ambient through a ventilation tube 1220 with an air channel 1212 in the mouth piece 1213. When the motor is turned off and the fluid contracts, there must be at least one of the holes 1211 that are in contact with the volume inside the rotor cavity. The fluid must wet against the material around the holes 1211. Contrary, the fluid must not wet against the material surrounding the opening in the mouth piece 1213. Furthermore, the volume of fluid inside the rotor cavity should even in its most expanded state not reach the opening in the mouth piece regardless of how the motor is tilted. When these conditions are met, the fluid will not exit to ambient through the channel 1212. The expansion and contractions of the motor components and the fluid can thereby be handled with no pressure difference over the sealed bearings 1214 and 1215.

FIG. 13 shows a section of a motor or generator 1301 having a dual circuit cooling. The internal circuit has liquid cooling. The external cooling can use liquid or air.

The motor has a soft iron stator 1302 with windings 1303 and a rotor 1304 with permanent magnets 1305.

The motor system has an internal liquid cooling circuit containing a magazine, a pumping device, a heat exchanging device thermally connecting the internal cooling circuit to an external cooling device, a magnet cooling channel and a return channel.

In the embodiment shown, the magazine and return channel consist of cavity 1306 in the rotor. During rotation, the cooling fluid will be forced radially outward by the centrifugal force as shown as level 1307. The cooling circuit also contains some air to reduce the pressure differences that would appear due to different thermal expansion of the parts, the air volume shown as 1308.

The pump acting on the internal circuit liquid is based on the centrifugal force created by the surface 1401 (shown in FIG. 14) of the rotor acting on the liquid between the rotating surface 1401 and the static surface of the rear shield 1309. The suitable shape of surface 1401 depends on the speed, temperature and liquid and may be anything from a rough surface to conventional fan wings as shown in FIG. 14.

The internal circuit fluid then passes through the gap 1316 between the stator 1302 and rotor magnets 1305, thereby cooling the magnets.

The fluid finally returns to the storage 1307. This path from the stator—rotor magnet gap to the storage 1307 will also act as a pump creating a pressure directed against the intended flow of the internal circuit liquid. By a suitable selection of distances between rotating parts and static parts, surface finish and eventually fan wings on the surface 1401, the flow can be kept in a suitable interval. The sealed screw in the rotor shaft 1315 is used to fill cooling fluid into the motor.

The external cooling in the embodiment shown consist of channels for a cooling fluid such as water or a water glycol mixture. Alternatively, air cooling can be used. The fluid enters through an inlet 1310 to a circular path 1311 in the rear shield 1309. After having passed 180 degrees in the path 1311 it enters a channel 1312 that leads to a spiral path 1313 in the stator tube 1314. The cooling fluid will keep the stator tube 1314 at a low temperature and thereby cool the stator iron 1302 directly and the stator coils 1303 indirectly (the stator coils being thermally connected to the stator iron).

The basic principle of having oil cooling in the rotor magnet—stator gap can be done in different ways with increased complexity:

A very simple system with external fluid channels 1311 or 1302 or both and with a secondary fluid volume large enough to fill the rotor magnet—stator gap can run without pumping devices. Such a system may limit the magnet temperature if the stator poles temperature is considerably lower than the critical temperature for the magnets. Even if the copper winding is at 130° C., the stator pole will be at some temperature between that of the winding and that of the stator tube, and the stator tube temperature can be quite low, for example when a spiral channel as the one shown as 1313 is fed with low temperature water.

The stator windings can be accessible to the magnet cooling internal circuit fluid as shown in FIG. 13. This will however increase the temperature of the magnet cooling internal circuit fluid compared to the embodiment shown.

Figure 15:
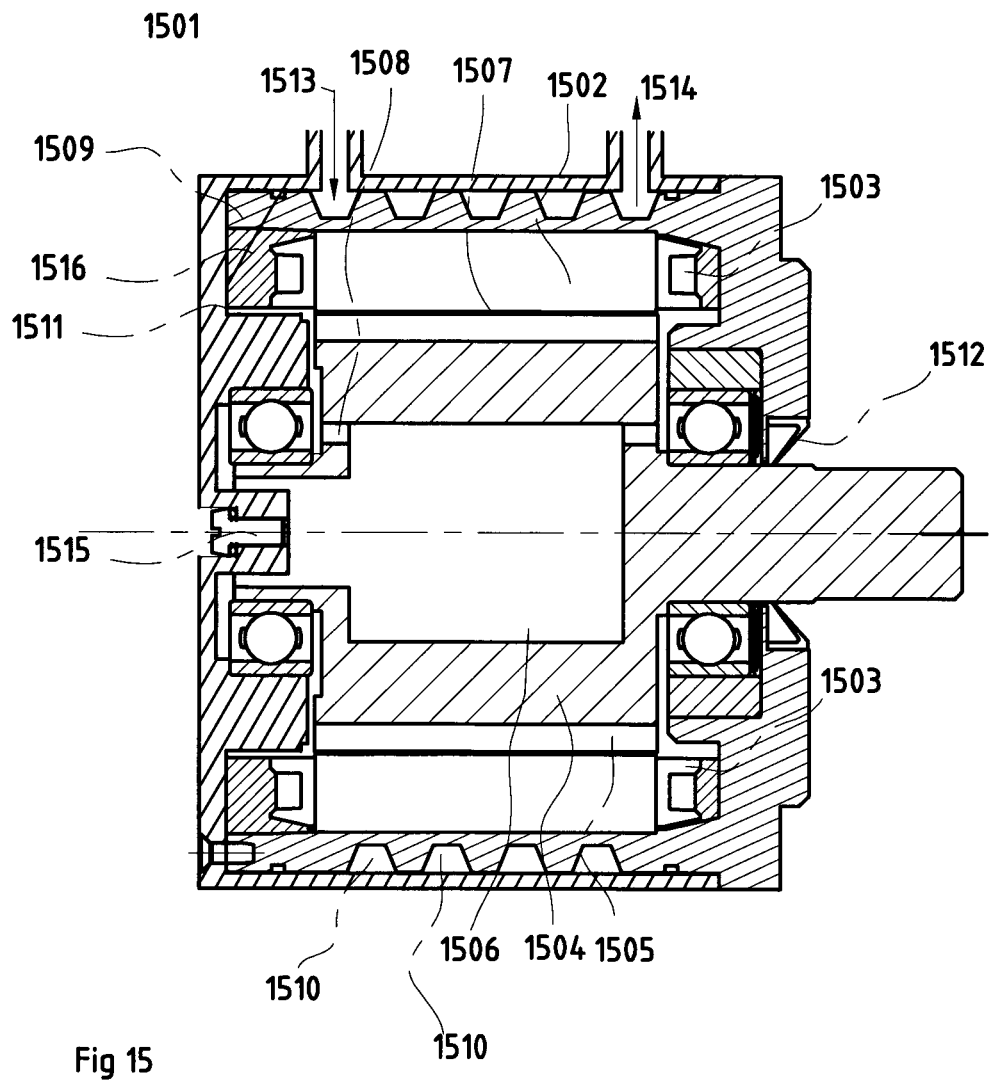

The stator windings can be encapsulated in some potting compound, thus limiting the heat transfer from the windings to the magnet cooling internal circuit fluid as shown in FIG. 15.

FIG. 15 shows a section of a motor or generator 1501 having a dual circuit liquid cooling like the motor of FIG. 13, but without pump fins and with potted stator. A potting compound 1516 fills most of the cavities in the motor that are outside of a cylinder touching the inner end of the winding bobbin 1503.

The motor has a soft iron stator 1502 with windings 1503 and a rotor 1504 with permanent magnets 1505.

The motor system has an internal liquid cooling circuit containing a fluid magazine and gas pressure change reducing volume 1506 feeding a thermally conductive fluid into the gap 1507 between the rotor and stator through feeding holes like 1508. The heat generated in the rotor iron and magnets are conducted through the fluid in the rotor-stator gap 1507 and the stator poles to the stator tube 1509 that is cooled by the external cooling fluid. The fluid enters at 1513, runs in a spiral shaped channel 1510 and exits at 1514.

The volume of cooling fluid inside the motor is selected so that there in all high speed operating conditions is fluid in the rotor-stator gap 1507. The air that initially may be inside the cavities such as 1511 that are outside the rotor-stator gap 1507 (outside as seen from the rotor shaft axis) will be replaced by fluid after that the centrifugal force has forced almost all fluids out of the rotor cavity 1506 and consequently air into the rotor cavity.

If there was no air (or some other gas) inside the motor, the different (normally higher) thermal expansion of the fluid would create a high pressure inside the motor when it is heated up. That could create fluid leakage in the shaft seal 1512 or parts such as electrical connectors (not shown). By having a relatively large cavity inside the rotor-stator gap 1507 and a suitable volume of the fluid, the pressure difference between a cool and hot motor can be reduced to a fraction of one Bar also for motors with much lower rotor diameter than the one shown in FIG. 15. The fluid can be entered for example by removing screw 1515 and replacing it with a mouthpiece that first applies vacuum to remove air, then fills the motor with a suitable volume of oil.

Figure 16:
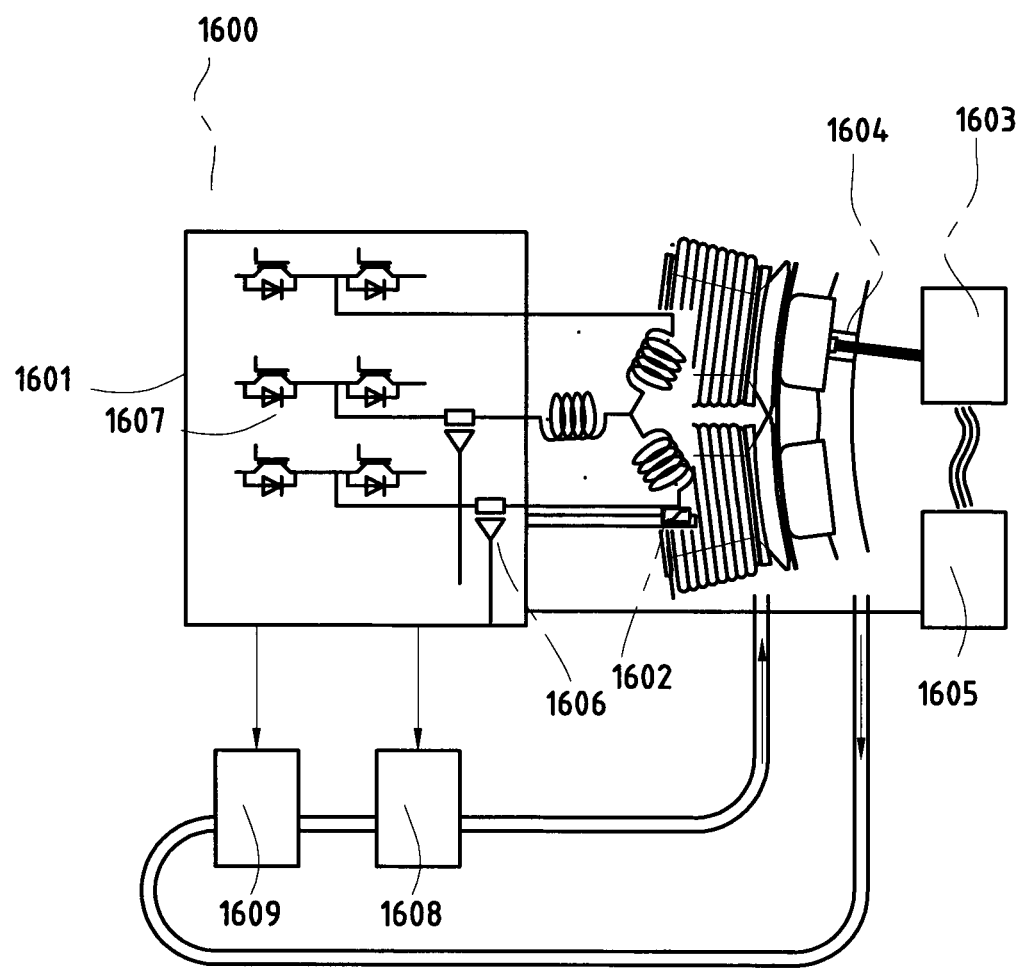
FIG. 16 shows an example of a control system according to the invention.

FIG. 16 shows an example of a control system 1600 according to the invention. The control unit 1601 obtains data on the stator coil temperature through a thermistor or other sensor 1602 inserted in some stator coils and data on the magnet temperature from a sensor 1603 placed on one of the rotor magnets. This information is transferred to the control unit 1601 through a transmitter 1603 on the rotor and a receiver 1605 on the motor chassis. Based on this information, the control unit can limit the motor currents to values within the safe operating range of the magnet valid for the current temperature of the magnet. As an example, the magnet material N48H does at 60° C. permit a large stator current that forces its internal B-field down to some 0.3 T (from some 1.2 T at zero stator current) without any irreversible demagnetization. At 100° C., the stator current must not force the magnets internal B-field down to less than some 0.6 T (from some 1.1 T at zero stator current). The current is controlled by the conventional switches 1607 and the resulting current is sensed by current transducers 1606 in the conventional manner. The actual temperature of the magnet can be estimated using a mathematical model where the recent power losses in the magnet and the estimated recent cooling can be used to estimate the temperature difference between the magnet hot spots and the magnet temperature at the position of the sensor 1603. The same information can be used to regulate the flow of the cooling fluid by changing the speed of the pump 1609 and/or the radiator 1608.

As is obvious for those skilled in the art, the temperature control can be accomplished in many ways. The rotor mounted temperature sensor can be replaced by a chassis mounted transducer as shown as item 1218 in FIG. 12. The rotor mounted temperature sensor must not be assembled directly on the magnet but can be assembled on some other part of the rotor that is thermally close, that is has a temperature that deviates only a few degrees from that of the rotor magnets.

The cooling fluid should have good insulating properties. Transformer oil is one possible cooling fluid.

Some preferred embodiments of a motors/generator suitable for sensitive high field strength magnets according to the invention have been described. However, the person skilled in the art realizes that these can be varied within the scope of the appended claims without departing from the inventive idea.

All the described alternative embodiments above or parts of an embodiment can be freely combined without departing from the inventive idea as long as the combination is not contradictory.

The invention claimed is:

1. An electric motor/generator, comprising
a rotor with magnets mounted on the surface of the rotor, the magnets facing a stator over a gap,
the magnets having a very high flux density but a limited ability to withstand high stator currents at high temperatures,
rotor magnet cooling means that reduces temperature of the magnets by a cooling fluid,
a rotor cavity inside the rotor,
both cooling fluid and air inside motor cavities, and
holes in the rotor permitting a cooling fluid internal to the motor to enter, leave, and reenter the rotor depending on a change in cooling fluid volume caused by motor temperature differences.

2. An electric motor/generator according to claim 1, comprising a ventilation tube with free access to the ambient air in one end and having its other end inside the rotor cavity.

3. An electric motor/generator according to claim 2, wherein the position of a ventilation tube mouthpiece inside the rotor cavity and the volume of the cooling fluid is selected in such a way that the surface of the cooling fluid does not reach the mouthpiece of the ventilation tube regardless of how the motor is tilted.

4. An electric motor/generator according to claim 2, wherein the volume of the cooling fluid is selected so that there always is fluid in the rotor-stator gap when the rotor rotates and that the pressure inside the motor at any temperature is low enough to avoid leakage through shaft seals.

5. An electric motor/generator according to claim 1, wherein the magnets are made of N48H material.

6. An electric motor/generator, comprising
a rotor with magnets mounted on the surface of the rotor, the magnets facing a stator over a gap,
the magnets having a very high flux density but a limited ability to withstand high stator currents at high temperatures, and
rotor magnet cooling means that reduces temperature of the magnets by a cooling fluid,
wherein the cooling of the magnets is accomplished by means of a cooling fluid from a source internal to the motor/generator that fills the gap between rotor magnets and the stator, the cooling fluid thereafter returning to the source, thus reducing the thermal resistance in the path from the magnets to an external cooling fluid through stator poles and a stator tube.

7. An electric motor/generator according to claim 6, wherein the cooling of the magnets is further improved by a transport by means of a pumping device of internal cooling fluid from a surface directly cooled by the external cooling fluid to the gap between rotor magnets and the stator.

8. An electric motor/generator according to claim 6, wherein the magnets are made of N48H material.

* * * * *